US012724283B2

(12) United States Patent
Bohn

(10) Patent No.: US 12,724,283 B2
(45) Date of Patent: Sep. 1, 2026

(54) BROADBAND REFLECTOR FOR WAVEGUIDE ASSEMBLY IN A HEAD-MOUNTED DISPLAY

(71) Applicant: Microsoft Technology Licensing, LLC, Redmond, WA (US)

(72) Inventor: David Douglas Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/082,076

(22) Filed: Oct. 28, 2020

(65) Prior Publication Data

US 2022/0128744 A1 Apr. 28, 2022

(51) Int. Cl.

*G02B 27/42* (2006.01)
*G02B 27/00* (2006.01)
*G02B 27/01* (2006.01)

(52) U.S. Cl.

CPC ..... *G02B 27/4205* (2013.01); *G02B 27/0081* (2013.01); *G02B 27/0103* (2013.01); *G02B 27/0172* (2013.01); *G02B 2027/0112* (2013.01)

(58) Field of Classification Search

CPC ...... G02B 5/00; G02B 5/816; G02B 26/0808; G02B 26/0816; G02B 2027/013; G02B 27/4205; G02B 6/0023; G02B 6/005; G02B 6/0076; G02B 2027/0174; G02B 2027/0112; G02B 2027/0114; G02B 2027/0194; G02B 27/0081; G02B 27/0103; G02B 6/29361; G02B 27/0172; G02F 1/133553

(Continued)

(56) References Cited

U.S. PATENT DOCUMENTS 9,891,436 B2 2/2018 Wall et al.
2006/0039046 A1 * 2/2006 Ouchi .................... G02B 27/02 359/15

(Continued)

FOREIGN PATENT DOCUMENTS

CN 110908125 A 3/2020
CN 111258070 A 6/2020

OTHER PUBLICATIONS

"International Search Report and Written Opinion Issued in PCT Application No. PCT/US21/048572", Mailed Date: Dec. 10, 2021, 9 Pages.

(Continued)

*Primary Examiner* — William R Alexander
*Assistant Examiner* — Kuei-Jen L Edenfield
(74) *Attorney, Agent, or Firm* — Michael T. Abramson; Jordan IP Law, LLC

(57) ABSTRACT

A partially reflective thin film coating is utilized on an optical substrate that is affixed to a waveguide-based optical combiner in a see-through display of a mixed-reality head-mounted display (HMD) device to partially reflect a forward propagating holographic image light back to the user's eye. The thin film coating may be implemented as a broadband reflector over the angular range associated with the holographic images that are rendered over the field of view (FOV) of the virtual portion of the see-through display to simplify manufacturing and reduce bulk and weight of the HMD device.

8 Claims, 17 Drawing Sheets

(58) Field of Classification Search
USPC .............................. 359/632, 633, 630; 345/8
See application file for complete search history.

(56) References Cited

U.S. PATENT DOCUMENTS

| | | | | |
|---|---|---|---|---|
| 2018/0052501 | A1 | 2/2018 | Jones et al. | |
| 2018/0231771 | A1* | 8/2018 | Schuck, III ........ | G03B 21/2013 |

OTHER PUBLICATIONS

Communication pursuant to Article 94(3) received in European Application No. 21786637.5 mailed on Apr. 30, 2025, 7 pages.

* cited by examiner

Rearward propagating holographic image light (1110)
Forward propagating holographic image light (1115)
Reflected holographic image light (1610)
130
Imager
1605
105
In-coupling DOE
(805)
Eye side (1125)
Real-world side (1120)
115
1110
1115
1610
Out-coupling DOE
(815)
1210
1205
1200

2100

BROADBAND REFLECTOR FOR WAVEGUIDE ASSEMBLY IN A HEAD-MOUNTED DISPLAY

BACKGROUND

Mixed-reality computing devices, such as head-mounted display (HMD) systems and handheld mobile devices (e.g. smart phones, tablet computers, etc.), may be configured to display information to a user about virtual objects, such as holographic images, and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera view-finder window.

SUMMARY

A partially reflective thin film coating is utilized on an optical substrate that is affixed to a waveguide-based optical combiner in a see-through display of a mixed-reality head-mounted display (HMD) device to partially reflect forward propagating holographic image light back to the user's eye. The thin film coating may be implemented as a broadband reflector over the angular range associated with the holographic images that are rendered over the field of view (FOV) of the virtual portion of the see-through display to simplify manufacturing and reduce bulk and weight of the HMD device.

In various illustrative embodiments, the broadband reflector may be fabricated using an optical substrate of glass or plastic that is the same or similar to materials used to implement the optical combiner in which a stack of three optical waveguides is utilized for a full color display using the red, green, blue (RGB) color model. The optical combiner employs diffractive optical elements (DOEs) on each waveguide for in-coupling holographic images from an image source, exit pupil expansion in two directions (e.g., horizontal and vertical), and out-coupling the images to the HMD user's eyes. The broadband filter may be assembled into the optical combiner with the RGB waveguides using consistent fabrication techniques to cut and stack the combiner elements so that the filter remains flat and tightly coupled with a high degree of parallelism with the RGB waveguides. Such fine control of the spatial orientation of the broadband reflector with respect to the RGB waveguides enables the display quality to be maintained with a minimum of undesirable color shift and reduction in MTF (modulation transfer function—a parameter that describes resolution and contrast).

The broadband reflector may be configured for particular applications by providing a suitable balance between reflection of holographic image light and corresponding reduction in transmittance of real-world light through the see-through display. In typical applications, the broadband reflector advantageously increases luminance and subjective brightness of the holographic images by reflecting a portion of the forward propagating light that would otherwise be out-coupled by the out-coupling DOE towards the real-world side of the see-through display. In addition, holographic image light escaping from the front of the display to the real-world side may be reduced which can enhance light security of the HMD device and improve user experiences in some applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
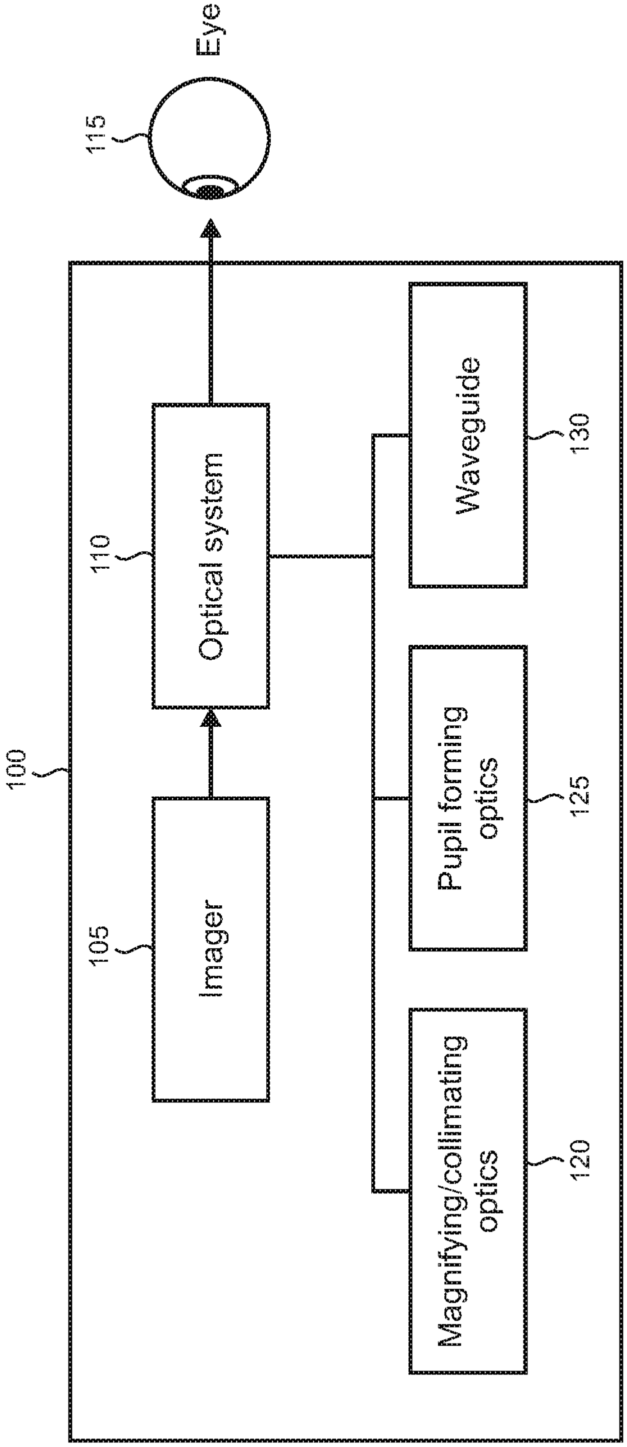
FIG. 1 shows a block diagram of an illustrative near-eye display system.

FIG. 1 shows a block diagram of an illustrative near-eye display system 100 which may incorporate an imager 105 and an optical system 110. The optical system 110 may also include magnifying and/or collimating optics 120 and pupil forming optics 125. In this illustrative example, the optical system is configured to provide functionalities as an exit pupil expander (EPE) and optical combiner, as described below.

The optical system 110 may comprise a waveguide 130 on which multiple diffractive optical elements (DOEs) are disposed and configured to provide in-coupling of incident light into the waveguide, exit pupil expansion in two directions, and out-coupling of light out of the waveguide to an eye 115 of a system user. Near-eye display systems are often used, for example, in head-mounted display (HMD) devices in industrial, commercial, and consumer applications. Other devices and systems may also use near-eye display systems, as described below. The near-eye display system 100 is an example that is used to provide context and illustrate various features and aspects of the present broadband reflector.

The imager 105 in system 100 may include one or more sources of virtual objects or holographic images (collectively referred to herein as "holographic images" that work with the optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager may also include electronics such as processors, optical components such as mirrors and/or lenses, and/or mechanical and other components that enable a virtual display to be composed and provide one or more input optical beams to the optical system.

In a near-eye display system the imager does not actually shine the images on a surface such as a glass lens to create the visual display for the user. This is not feasible because the human eye cannot focus on something that is that close. Rather than create a visible image on a surface, the near-eye display system 100 uses the optical system to form a pupil and the eye 115 acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the holographic image light after leaving the display system. The exit pupil defines the eyebox which comprises a spatial range of eye positions of the user in which the holographic images projected by the display system are visible.

The waveguide 130 facilitates light transmission between the imager and the eye. One or more waveguides can be utilized in the near-eye display system because they are transparent and because they are generally small and lightweight (which is desirable in applications such as HMD devices where size and weight are generally sought to be minimized for reasons of performance and user comfort). For example, the waveguide 130 can enable the imager 105 to be located out of the way, for example, on the side of the user's head or near the forehead, leaving only a relatively small, light, and transparent waveguide optical element in front of the eyes.

Figure 2:
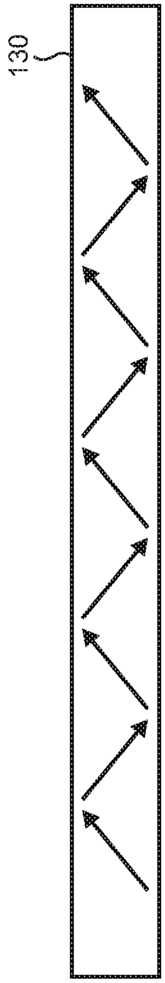
FIG. 2 shows propagation of light in a waveguide by total internal reflection (TIR)

In an illustrative implementation, the waveguide 130 operates using a principle of total internal reflection (TIR), as shown in FIG. 2, so that light can be coupled among the various optical elements in the system 100. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Figure 3:
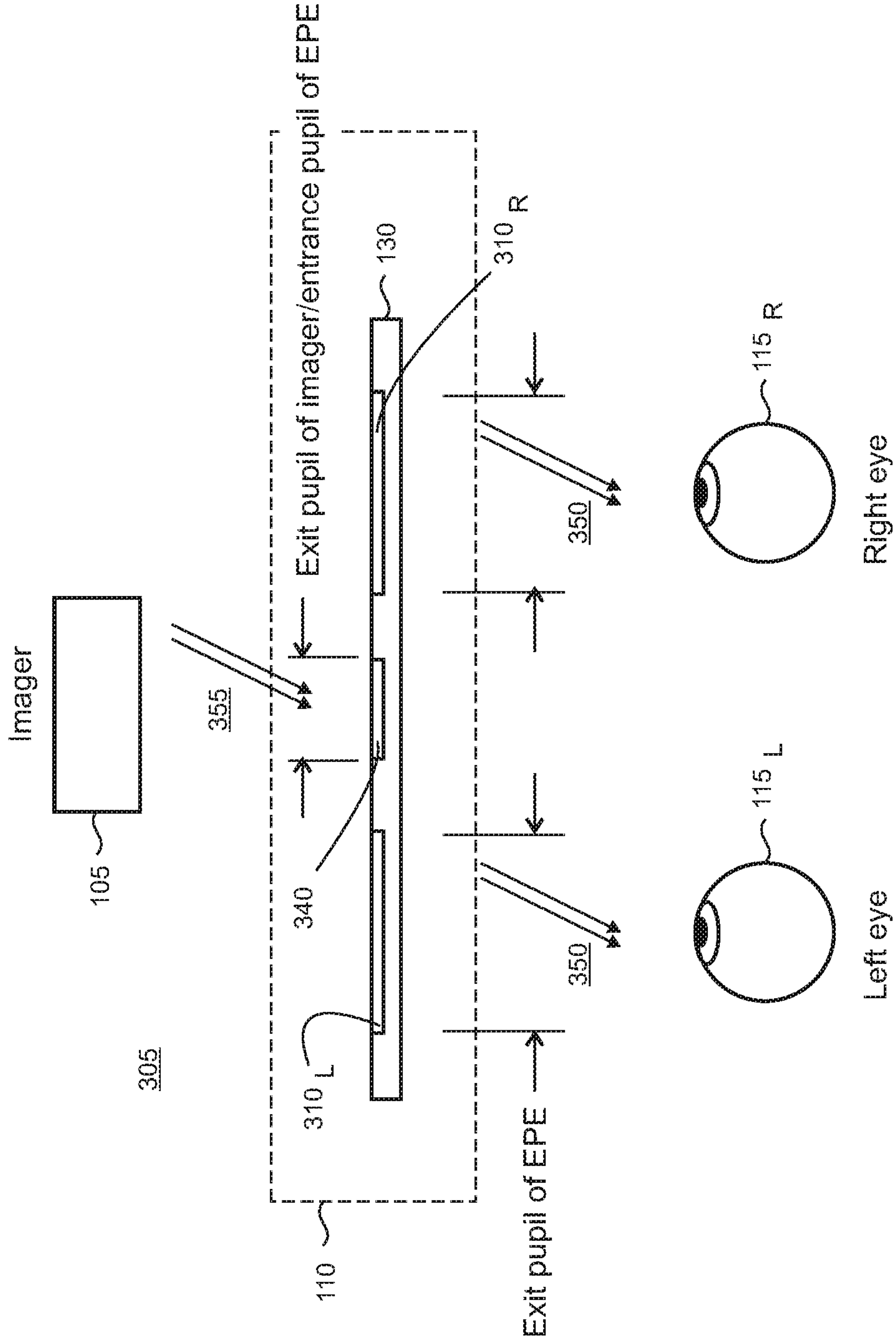
FIG. 3 shows a view of an illustrative exit pupil expander.

FIG. 3 shows a view of an illustrative exit pupil expander (EPE) 305. EPE 305 receives one or more input optical beams from the imager 105 as an entrance pupil for holographic image light to produce one or more output optical beams with expanded exit pupil in one or two directions relative to the input. The expanded exit pupil typically facilitates a virtual display to be sufficiently sized to meet the various design requirements, such as eyebox size, image resolution, field of view (FOV), and the like, of a given optical system while enabling the imager and associated components to be relatively light and compact.

The EPE 305 is configured, in this illustrative example, to provide binocular operation for both the left and right eyes which may support binocular or stereoscopic viewing. Components that may be utilized for binocular or stereoscopic operation such as scanning mirrors, lenses, filters, beam splitters, MEMS (micro-electromechanical system) devices, or the like are not shown in FIG. 3 for sake of clarity in exposition. The EPE 305 utilizes two out-coupling gratings, 310L and 3108 that are supported on a waveguide 130 and a central in-coupling grating 340.

The in-coupling and out-coupling gratings may be configured using multiple DOEs and may further include one or more intermediate DOEs (not shown) as described below. The DOEs may be arranged in various configurations on the waveguide, for example, on the same side or different sides and may further be single- or double-sided. While the EPE 305 is depicted as having a planar configuration, other shapes may also be utilized including, for example, curved or partially spherical shapes, in which case the gratings disposed thereon may be non-co-planar.

As shown in FIG. 3, exemplary output beams 350 from the EPE 305 are parallel to the exemplary input beams 355 that are output from the imager 105 to the in-coupling grating 340. In some implementations, the input beams are collimated such that the output beams are also collimated, as indicated by the parallel lines in the drawing. Typically, in waveguide-based combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread.

The collimated inputs and outputs result in holographic images displayed by the optical system 110 to be focused at infinity. Therefore, in some optical system designs the images can be set at a closer distance (e.g., 2 m) for better visual comfort for the user by employing a negative lens (e.g., −0.5 diopters) over the entire eyebox. For an unperturbed see-through experience, such a lens needs to be compensated by its conjugate that is placed on the real-world side of the waveguide.

Figure 4:
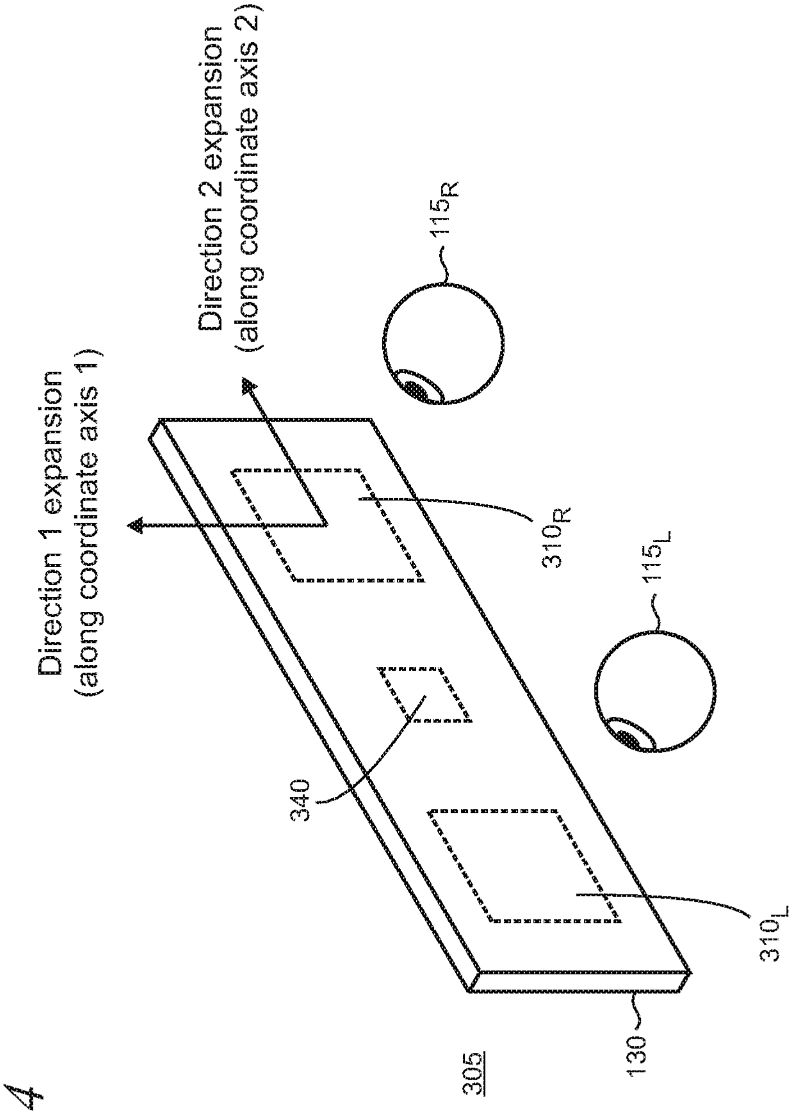
FIG. 4 shows a view of an illustrative exit pupil expander in which the exit pupil is expanded along two directions of the field of view (FOV)

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of near-eye display features utilized in the present arrangement.

Figure 5:
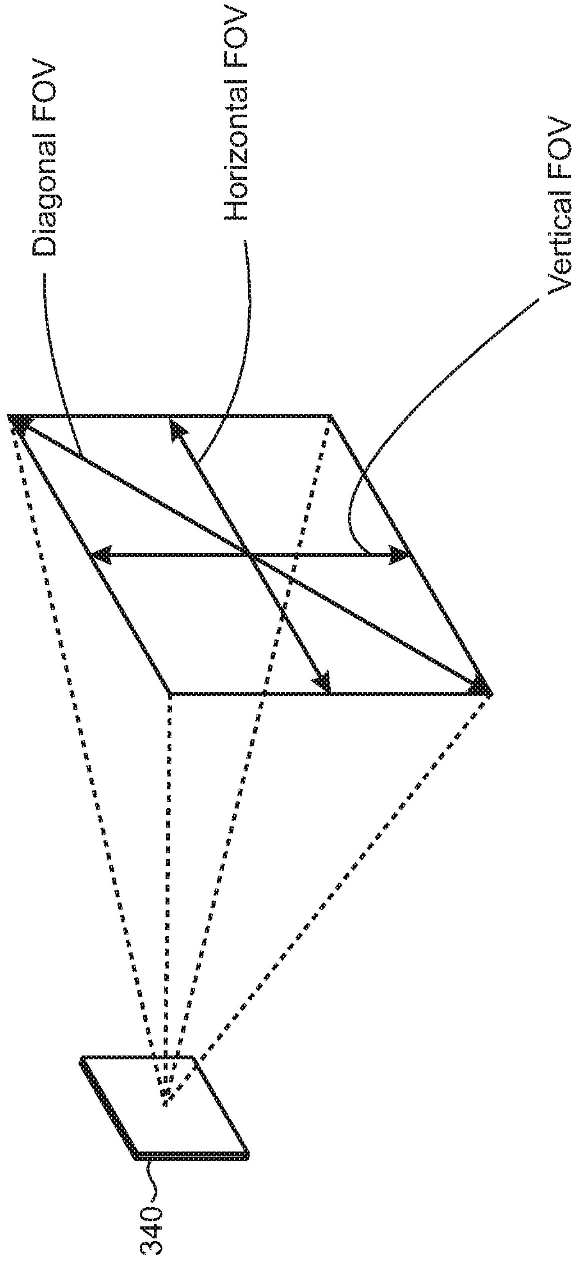
FIG. 5 shows an illustrative input to an exit pupil expander in which the FOV is described by angles in horizontal, vertical, or diagonal orientations.

The entrance pupil to the EPE 305 at the in-coupling grating 340 is generally described in terms of field of view (FOV), for example, using horizontal FOV, vertical FOV, or diagonal FOV as shown in FIG. 5. The FOV is typically a parameter of interest that can vary by application. For example, an HMD device for one application may be designed with a diagonal FOV of 34 degrees while another may have a 52 degree FOV. Some non-planar waveguide-based HMD devices have been proposed with FOVs of more than 70 degrees. It is noted that FOV is just one of many parameters that are typically considered and balanced by HMD designers to meet the requirements of a particular implementation. For example, such parameters may include eyebox size, brightness, transparency and duty time, contrast, resolution, color fidelity, depth perception, size, weight, form-factor, and user comfort (i.e., wearable, visual, and social), among others.

Figure 6:
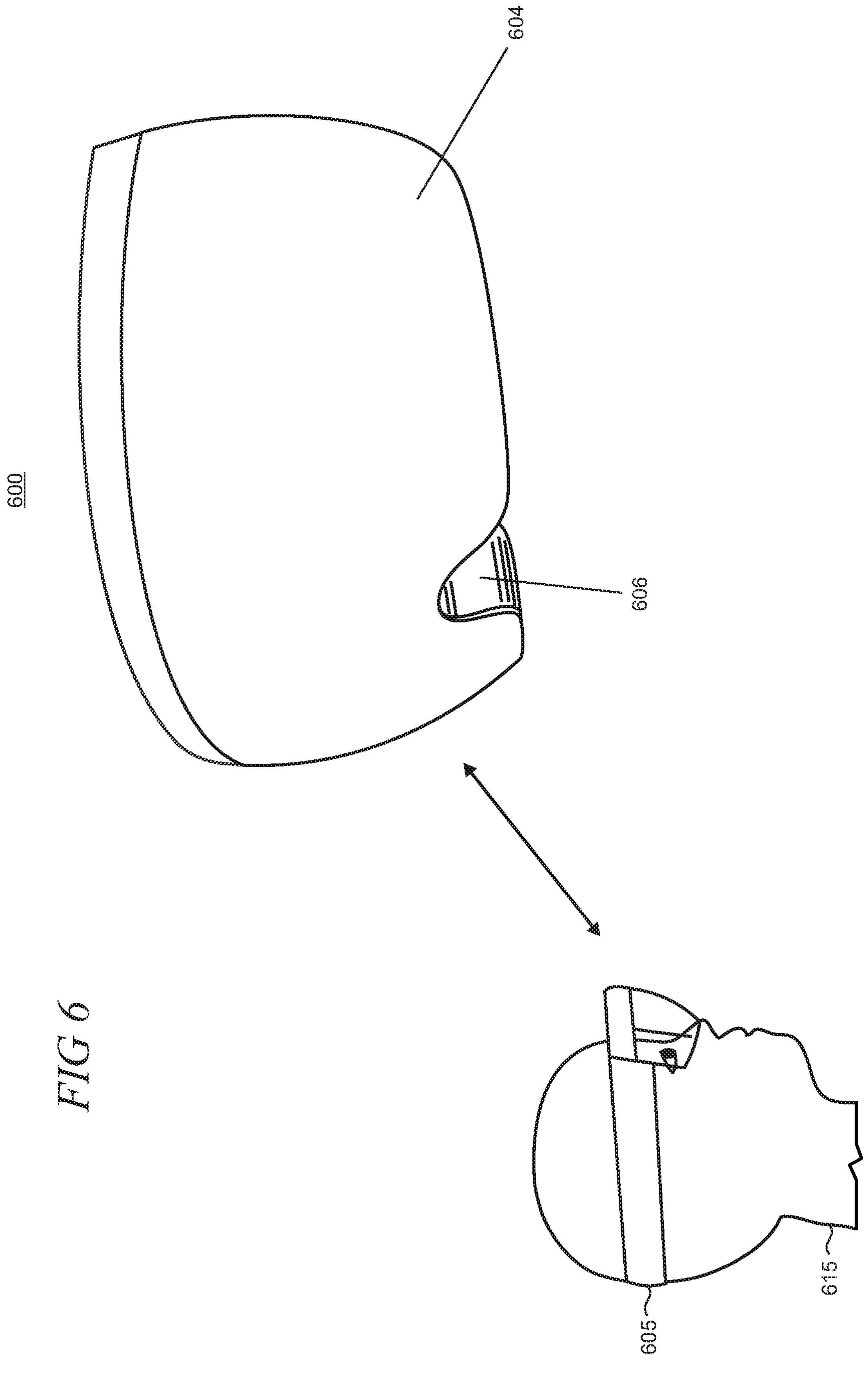
FIG. 6 shows a pictorial front view of a sealed visor that may be used as a component of a head-mounted display (HMD) device.

FIG. 6 shows an illustrative example of a visor 600 that incorporates an internal near-eye display system that is used in a head-mounted display (HMD) device 605 worn by a user 615. The visor 600, in this example, is sealed to protect the internal near-eye display system. The visor 600 typically interfaces with other components of the HMD device 605 such as head-mounting/retention systems and other subsystems including sensors, power management, controllers, etc., as illustratively described in conjunction with FIGS. 19 and 20. Suitable interface elements (not shown) including snaps, bosses, screws and other fasteners, etc. may also be incorporated into the visor 600.

The visor 600 includes see-through front and rear shields, 604 and 606 respectively, that can be molded using transparent materials to facilitate unobstructed vision to the optical displays and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 705 shown in the disassembled view in FIG. 7.

The sealed visor 600 can physically protect sensitive internal components, including a near-eye display system 702 (shown in FIG. 7), when the HMD device is operated and during normal handling for cleaning and the like. The near-eye display system 702 includes left and right waveguide displays 710 and 715 that respectively provide virtual world images to the user's left and right eyes for mixed- and/or virtual-reality applications. The visor 600 can also protect the near-eye display system 702 from environmental elements and damage should the HMD device be dropped or bumped, impacted, etc.

Figure 7:
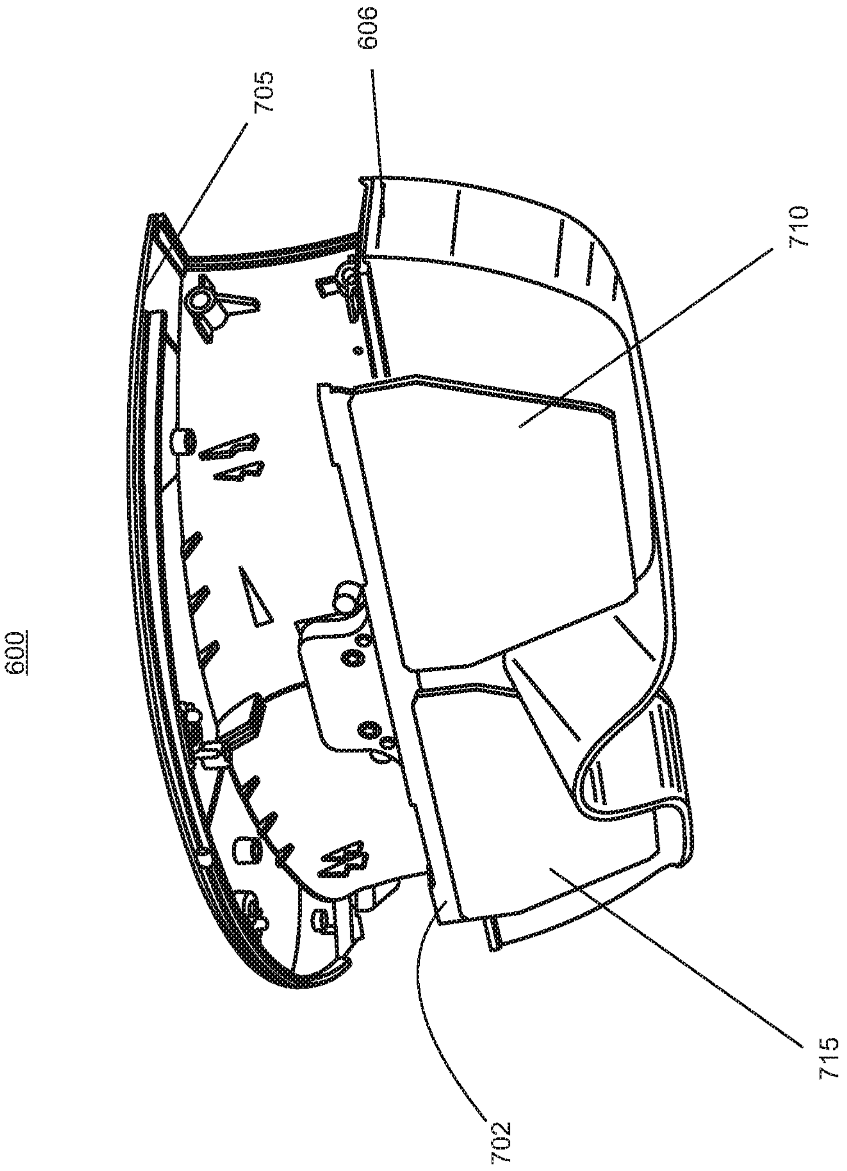
FIG. 7 shows a partially disassembled view of the sealed visor.

As shown in FIG. 7, the rear shield 606 is configured in an ergonomically suitable form to interface with the user's nose, and nose pads and/or other comfort features can be included (e.g., molded-in and/or added-on as discrete components). The sealed visor 600 can also incorporate some level of optical diopter curvature (i.e., eye prescription) within the molded shields in some cases.

Figure 8:
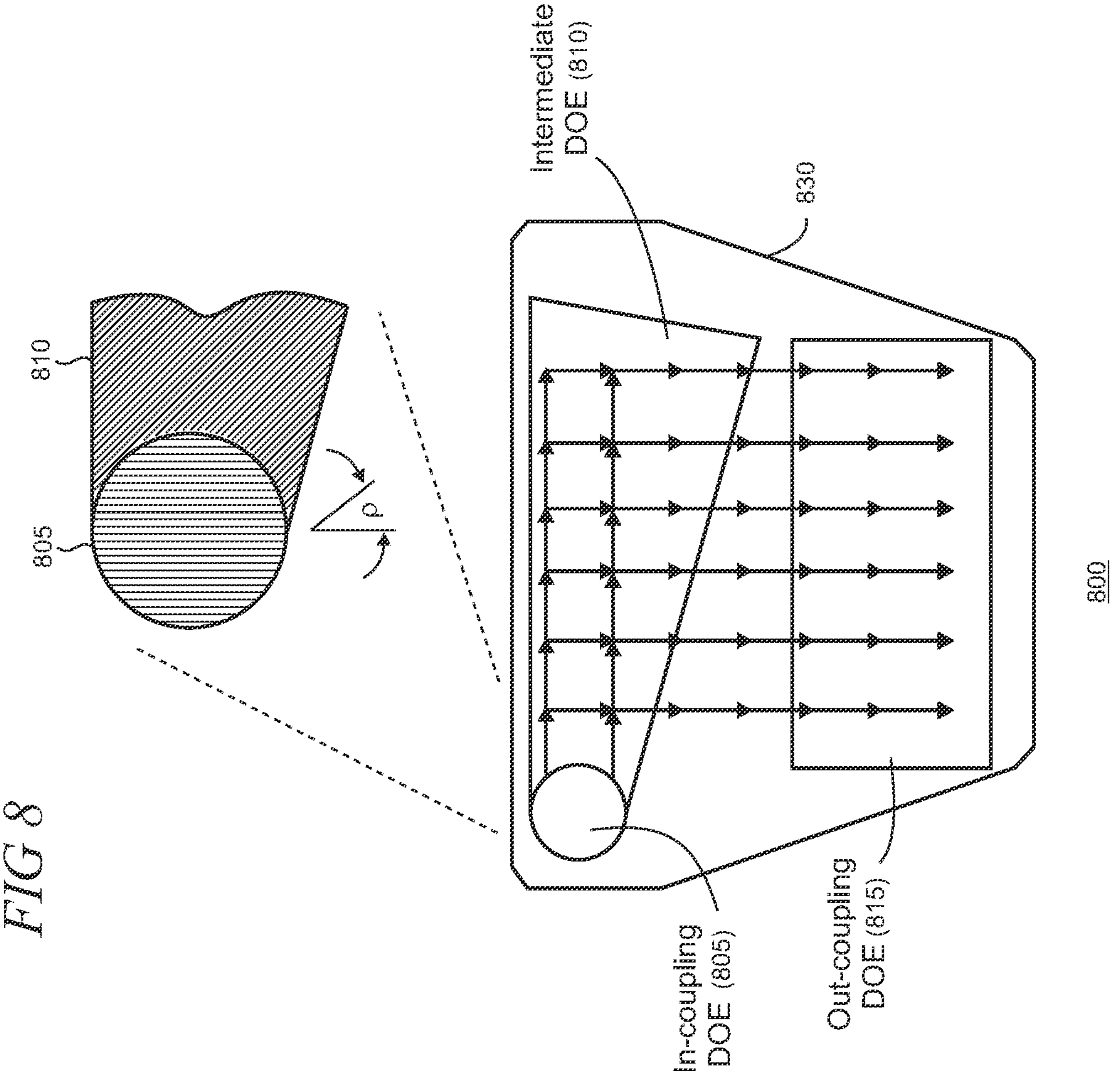
FIG. 8 shows an illustrative arrangement of diffractive optical elements (DOEs) configured for in-coupling, exit pupil expansion in two directions, and out-coupling.

FIG. 8 shows an illustrative waveguide display 800 having multiple DOEs that may be used with, or incorporated as a part of, a see-through waveguide 830 to provide in-coupling, expansion of the exit pupil in two directions, and out-coupling. The waveguide display 800 may be utilized in an exit pupil expander that is included in the near-eye display system 702 (FIG. 7) to provide holographic images to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating.

The waveguide display 800 includes an in-coupling DOE 805, an out-coupling DOE 815, and an intermediate DOE 810 that couples light between the in-coupling and out-coupling DOEs. The in-coupling DOE 805 is configured to couple image light comprising one or more imaging beams from an imager 105 (FIG. 1) into the waveguide. The intermediate DOE 810 expands the exit pupil in a first direction along a first coordinate axis (e.g., horizontal), and the out-coupling DOE 815 expands the exit pupil in a second direction along a second coordinate axis (e.g., vertical) and couples light out of the waveguide to the user's eye (i.e., outwards from the plane of the drawing page). The angle $\rho$ is a rotation angle between the periodic lines of the in-coupling DOE 805 and the intermediate DOE 810 as shown. As the light propagates in the intermediate DOE 810 (horizontally from left to right in the drawing), it is also diffracted (in the downward direction) to the out-coupling DOE 815.

While DOEs are shown in this illustrative example using a single in-coupling DOE disposed to the left of the intermediate DOE 810, which is located above the out-coupling DOE, in some implementations the in-coupling DOE may be centrally positioned within the waveguide and one or more intermediate DOEs can be disposed laterally from the in-coupling DOE to enable light to propagate to the left and right while providing for exit pupil expansion along the first direction. It may be appreciated that other numbers and arrangements of DOEs may be utilized to meet the needs of a particular implementation.

Figure 9:
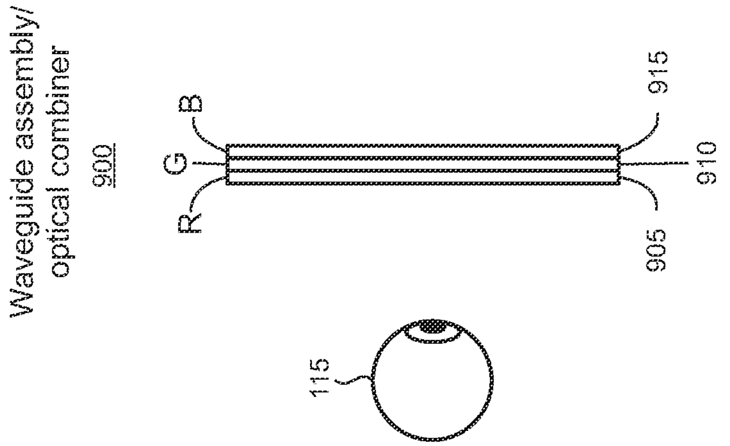
FIG. 9 shows a side view of an illustrative assembly of three waveguides with integrated DOEs that are stacked to form an optical combiner, in which each waveguide handles a different color in an RGB (red, green, blue) color model.

FIG. 9 shows a side view of an illustrative assembly 900 of three waveguides with integrated DOEs that are stacked to form an optical combiner (e.g., as part of the optical assembly 110 shown in FIG. 1 and described in the accompanying text), in which each waveguide 905, 910, and 915 respectively handles a different color in an RGB (red, green, blue) color model within some input angular range that corresponds to the FOV of a given HMD device. In typical implementations, the red wavelength range is from 600 nm to 650 nm, the green wavelength range is from 500 nm to 550 nm, and the blue wavelength range is from 430 nm to 480 nm. Other wavelength ranges are also possible.

The stacked waveguides 905, 910, and 915 and their corresponding integrated DOEs may be referred to collectively as a waveguide assembly 900 which functions as an optical combiner (in the discussion that follows, the terms are considered synonymous unless statements or context indicate otherwise). The color order within the assembly can vary by implementation and other color models may also be used to meet the needs of a particular application. Use of the waveguide assembly enables holographic images to be guided to the eye 115 across a full-color spectrum. The distance between adjacent waveguides of the assembly 900 can be, for example, between approximately 50 micrometers (μm) and 300 μm but is not limited thereto. While not specifically shown, spacers, supports, and/or other structures can be utilized to provide the desired spacing among adjacent waveguides.

In alternative implementations, assemblies with more or fewer waveguides can be utilized, for example, for monochromatic and reduced-color spectrum applications. A single optical substrate may be used to implement a given waveguide in some applications, while other applications can use other counts. Some colors may also be supported using two or more waveguides. For example, an RGBG arrangement may be used in which an extra waveguide provides additional green light which may increase display luminance in some cases.

Figure 10:
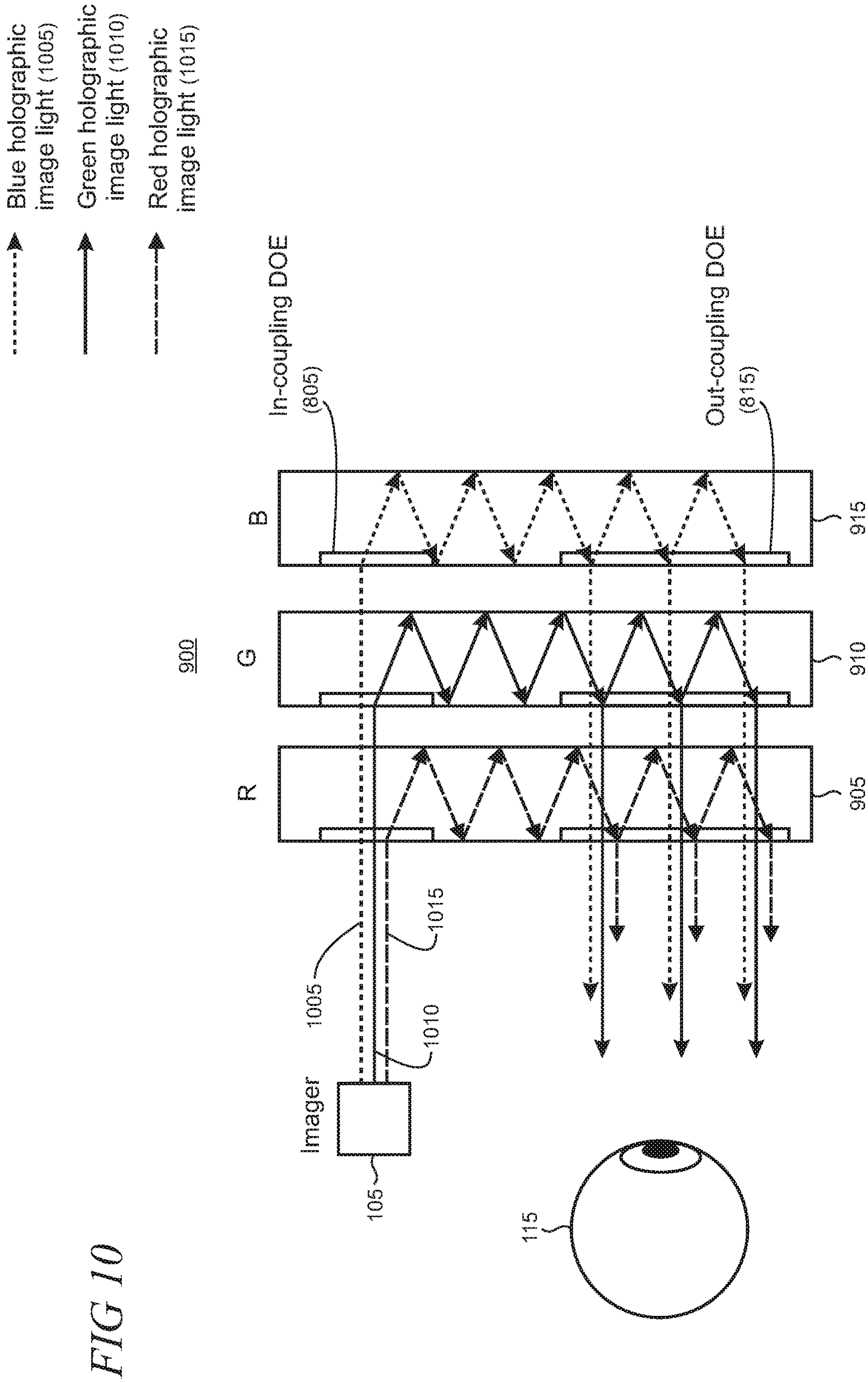
FIG. 10 shows illustrative propagation of holographic image light through an optical combiner.

FIG. 10 shows illustrative propagation of holographic image light through the optical combiner 900. For a given angular range within the FOV, light for each color component 1005, 1010, and 1015 provided by the imager 105 is in-coupled into respective waveguides 905, 910, and 915 using respective individual in-coupling DOEs (representatively indicated by element 805). The holographic light for each color propagates through the respective intermediate DOEs (not shown in FIG. 10) and the waveguides in TIR and is out-coupled by respective out-coupling DOEs (representatively indicated by element 815) to the user's eye 115 with an expanded pupil in the horizontal and vertical directions.

The in-coupling DOE 805 for each waveguide 905, 910, and 915 is configured to in-couple light within angular range described by the FOV and within a particular wavelength range into the waveguide. Light outside the wavelength range passes through the waveguide. For example, the blue holographic image light 1005 is outside the range of wavelength sensitivity of both of the in-coupling DOEs in the red waveguide 905 and green waveguide 910. The blue holographic image light therefore passes through the red and green waveguides to reach the in-coupling DOE in the blue waveguide 915 where it is in-coupled, propagated in TIR within the waveguide, expanded in a horizontal direction in the intermediate DOE (not shown), propagated to the out-coupling DOE where it is expanded in a vertical direction, and out-coupled to the user's eye 115 with an expanded exit pupil relative to the input.

Figure 11:
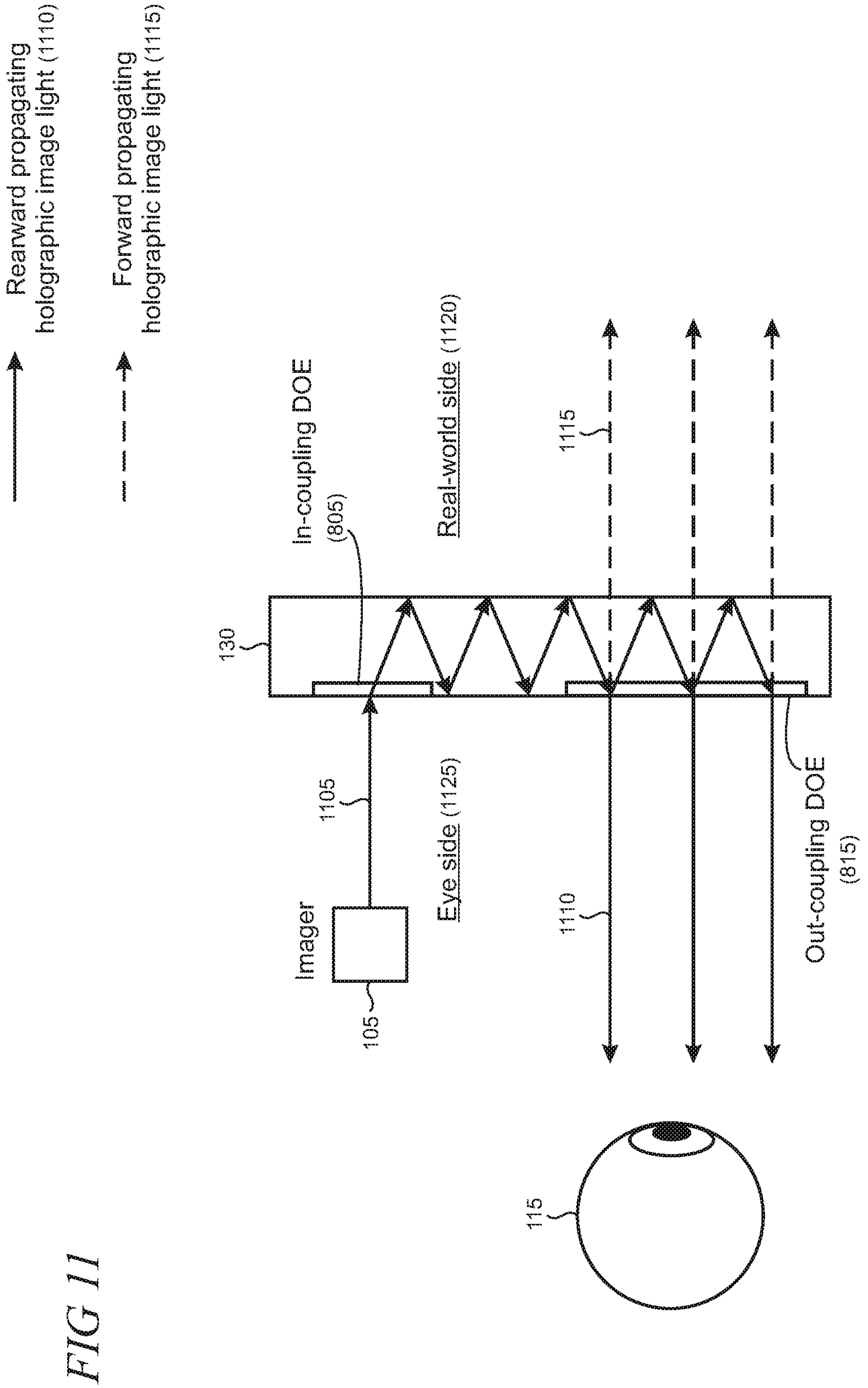
FIG. 11 illustratively shows how holographic image light may propagate in forward and backward directions from an out-coupling DOE.

FIG. 11 illustratively shows how holographic image light may propagate in forward and backward directions from an out-coupling DOE. In this illustration, only a single waveguide 130 of an optical combiner is shown to aid clarity in presentation. However, it may be appreciated that the principles of operation illustrated in the drawing are applicable to an optical combiner that uses multiple waveguides. Holographic image light 1105 from the imager 105 within a particular FOV angle and wavelength is in-coupled by the in-coupling DOE 805. When the holographic image light propagates to the out-coupling DOE 815, it is diffracted forward (i.e., towards the real-world side of the waveguide, as indicated by reference numeral 1120) and rearward (i.e., towards the eye 115 of the user, as indicated by reference numeral 1125). The distribution between forward and rearward propagation is dependent on FOV angle, but on average is equally split between the two directions.

Unlike the rearward propagating light 1110, the forward propagating holographic image light 1115 is typically unusable and may thus be considered wasted light in some cases. In addition, the forward propagating holographic image light may be visible by others which can be a nuisance in some applications or represent a security risk in other applications where it is desired that an HMD user's location is not revealed, for example at nighttime or in dark environments.

Figure 12:
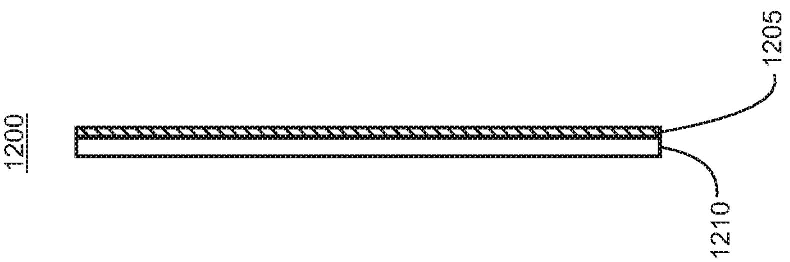
FIG. 12 shows an illustrative example of the present broadband reflector that comprises a thin film that is disposed on an optical substrate.

FIG. 12 shows an illustrative example of a broadband reflector 1200 that is arranged in accordance with the principles of the current invention. The broadband reflector comprises a thin film coating 1205 that is disposed on an optical substrate 1210. Thin film 1205 comprises a broadband reflective coating that is configured to reflect light within the visible wavelength range (i.e., 400 to 650 nm). The reflectance characteristics of the broadband reflector can be tailored to be fairly consistent over a range of angles associated with the FOV of the display to ensure that the luminance associated with the reflected holographic light is acceptably uniform over the entire display.

Figure 13:
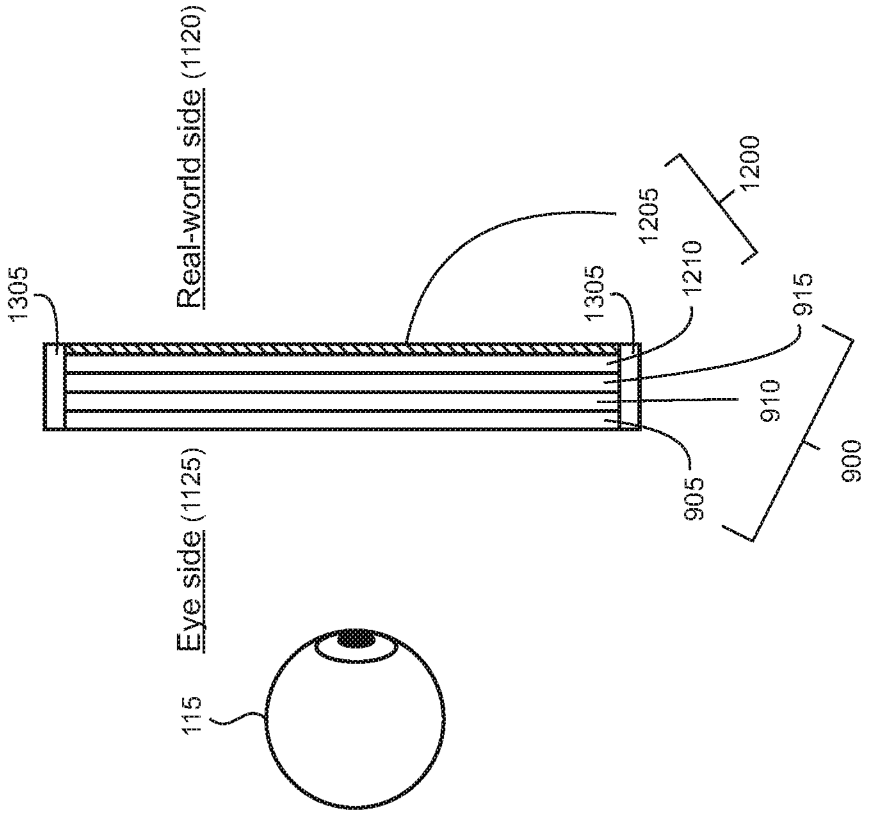
FIG. 13 shows an illustrative broadband reflector that is disposed on the real-world side of a waveguide assembly that forms an optical combiner.

FIG. 13 shows the broadband reflector 1200 that is assembled with the waveguide assembly 900. As shown, the broadband reflector is located on the real-world side 1120 of the waveguide assembly 900. The broadband reflector may be constructed from the same or similar materials as the waveguides 905, 910, and 915, for example thin glass or plastic substrates. The broadband reflectors and waveguides may also be subjected to consistent fabrication techniques during display manufacturing so that the reflector is able to be cut and assembled with the waveguide assembly in a close-fitting manner while holding tight tolerances for flatness and alignment. For example, the broadband reflector can be configured to utilize substantially the same spacing that is provided for the waveguides (e.g., approximately 50 μm to 300 μm).

The alignment between the broadband reflector and waveguide assembly may be facilitated by one or more structural fittings 1305 that are located, in this illustrative example, at the top and bottom of the assembly. However, alignment and flatness may be alternatively maintained using spacers or the like that fit in the gaps between the broadband reflector 1200 and the waveguide assembly 900.

The close-fitting arrangement between the broadband reflector 1200 and waveguide assembly 900 may be expected to minimize impact on display quality in typical applications by ensuring that the reflected holographic image light maintains coherency with the rearward propagating light. That is, maintaining flatness and alignment of the broadband reflector with the waveguide assembly within a predetermined tolerance may minimize ghost images and interference that can degrade the MTF of the holographic images beyond an acceptable limit.

The thin film coating 1205 may comprise single or multiple layers of dielectric materials in which the coating composition and thickness is selected to provide the desired reflectance characteristics over the FOV of interest. The thin film coating may be disposed uniformly across the substrate 1210 so that the real world appears consistently across the entire see-through display for all angles associated with a given FOV that is selected for the waveguide assembly. As reflectance of the thin film coating can be expected to vary as a function of angle, some threshold reflectance can typically be specified that provides a satisfactory function across the FOV range. While not shown in FIG. 13, the thin film coating may be disposed only on a lower portion of the substrate in correspondence with the location of the out-coupling DOE 815 (FIG. 8) and/or the eyebox of the user.

Figure 14:
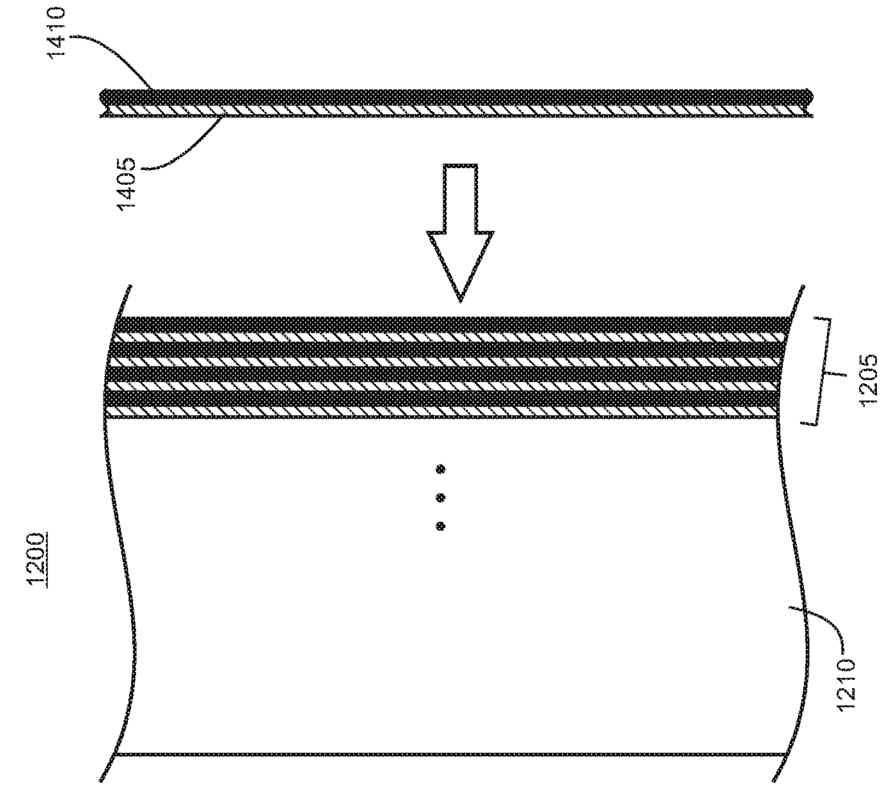
FIG. 14 shows an illustrative thin film broadband reflective coating that includes alternating layers of two different materials on a surface of an optical substrate.

FIG. 14 shows an illustrative thin film broadband reflective coating 1205 that includes alternating layers of two different materials 1405 and 1410 that are disposed on a surface of the optical substrate 1210. The materials each have a different refractive index and may include, for example, silicon dioxide ($SiO_2$), titanium dioxide ($TiO_2$), and aluminum oxide ($Al_2O_3$). In an illustrative embodiment, the layers of different materials are alternately arranged using, for example, silicon dioxide and titanium dioxide. It is noted that the number of layers shown in the drawings is intended to be illustrative and that variations from the configuration shown can be expected as necessary to meet the requirements of a particular implementation.

Other exemplary dielectric materials that can be included in the coating 1205 may include, but are not limited to, silicon hydride (SixHy), silicon nitride (SixNy), silicon oxynitride (SixOzNy), tantalum oxide (TaxOy), gallium arsenide (GaAs), and gallium nitride (GaN). It is also possible that one or more layers of the coating may comprise metallic layers that are non-dielectric.

Chemical and/or physical deposition techniques can be used to deposit the materials on a surface of the substrate 1210 to form the coating 1205. Exemplary chemical deposition techniques that can be used include, but are not limited to, chemical solution deposition (CSD), spin coating, chemical vapor deposition (CVD), plasma-enhanced chemical film conversion (PECFC), and atomic layer deposition (ALD). Exemplary physical deposition techniques that can be used include, but are not limited to, physical vapor deposition (PVD), molecular beam epitaxy (MBE), sputtering, pulsed laser deposition (PLD), cathodic arc deposition (arc-PVD), and electrohydrodynamic deposition.

Figure 15:
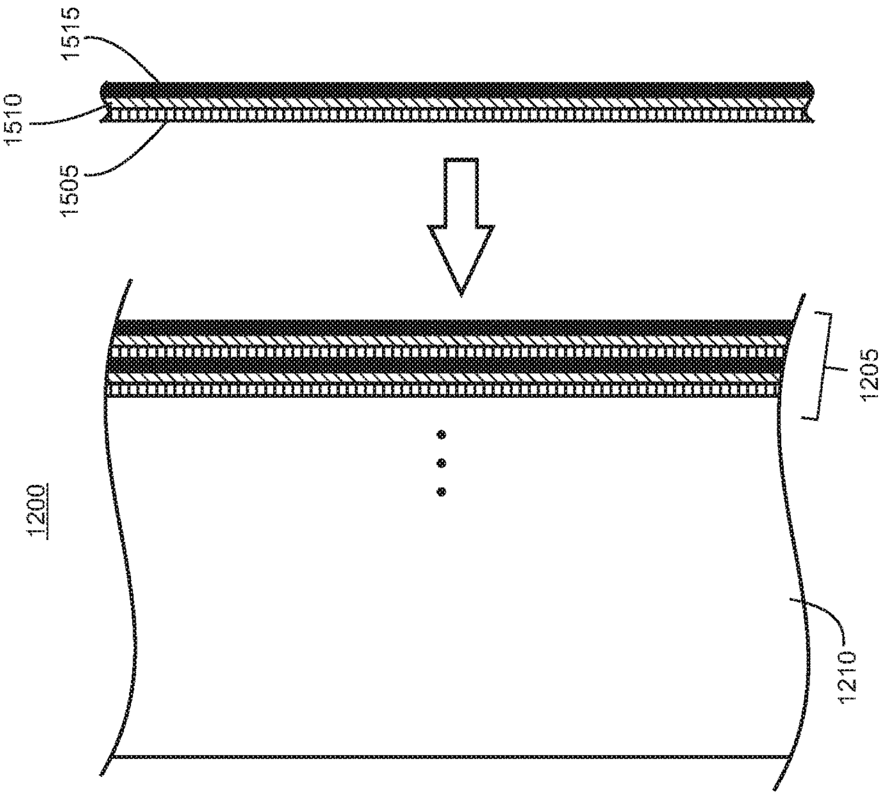
FIG. 15 shows an illustrative broadband reflective coating that includes alternating layers of three different materials on a surface of an optical substrate.

FIG. 15 shows an illustrative thin film broadband reflective coating 1205 that includes alternating layers of three different materials 1505, 1510, and 1515 that are disposed on a surface of an optical substrate 1210. In an illustrative embodiment, the layers of different materials are alternately arranged, for example, using silicon dioxide, titanium dioxide, and aluminum oxide.

The number of layers that are utilized for the thin film broadband reflective coating 1205 can vary to meet the needs of a particular application. In general, it is desirable to minimize the number of layers to simplify fabrication and reduce cost. Thicker coatings may give rise to stresses in the broadband reflector that can cause strain in the substrate 1210 that may negatively impact alignment and flatness (with concomitant negative impact on MTF) and reduce reliability. While thicker substrates may be used to reduce the strain and help to maintain alignment and flatness, such configuration may result in more weight being added to the waveguide assembly which is typically undesirable in HMD applications.

By employing a broadband reflector rather than, for example, a multi-band narrowband (i.e., "notch") reflector that is tuned to the wavelengths of the individual components of the RGB color model, the number of dielectric layers may be reduced. This design advantageously provides additional design flexibility by increasing the variety of substrate materials usable for the broadband reflector beyond glass which can be heavier and more costly than plastics.

A multi-band notch reflector may also be expected to reduce contrast of the see-through display and cause an undesirable color shift of the real-world images. In addition, some real-world objects of particular colors may have reduced visibility to the user through the multi-band notch reflector which can negatively impact user experience quality and/or pose safety issues in some environments where colored indicators are utilized (e.g., traffic lights, factory warning lights, etc.).

Figure 16:
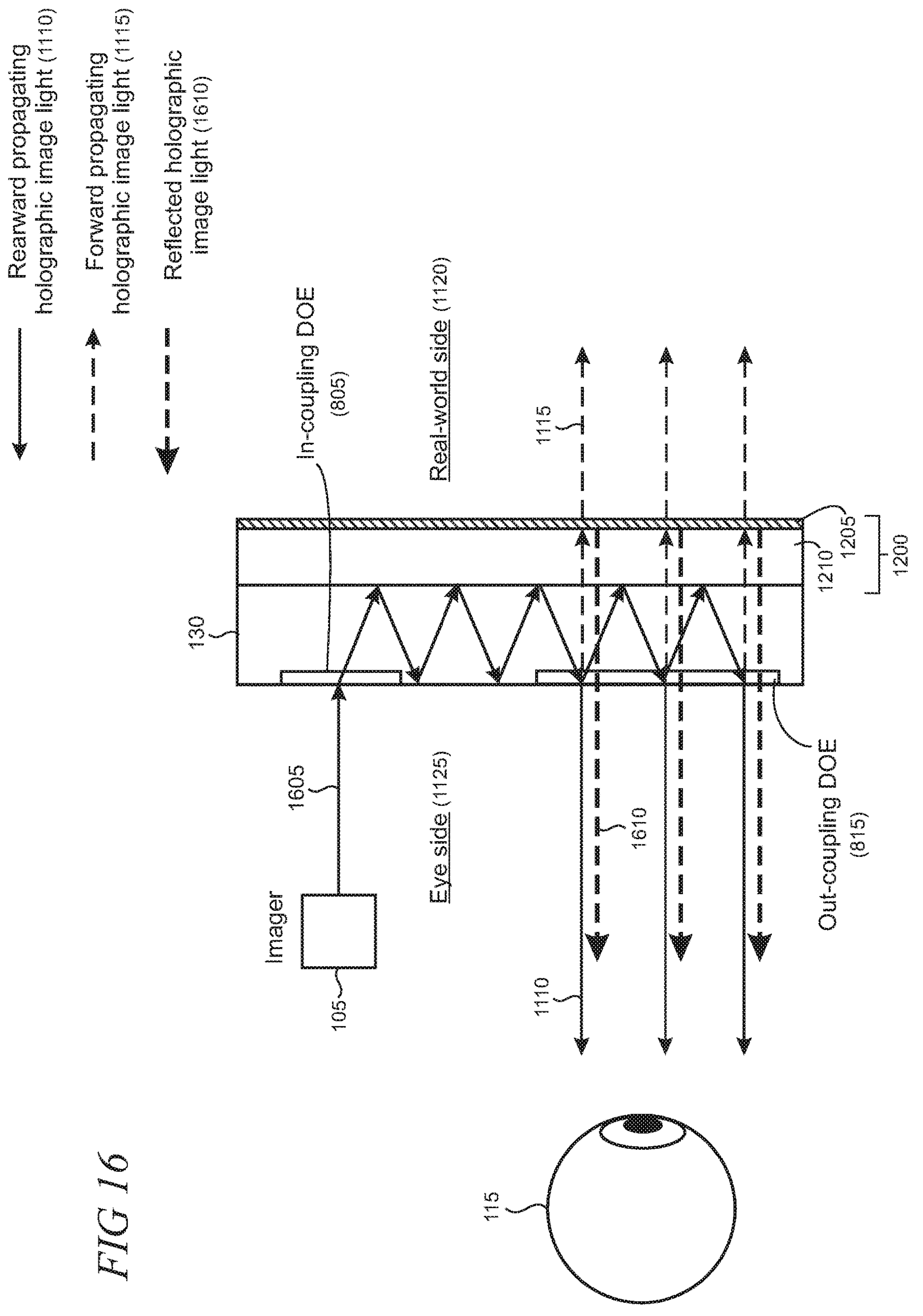
FIG. 16 illustratively shows how holographic image light may be at least partially reflected back to the eye side of an optical combiner.

FIG. 16 illustratively shows how holographic image light 1605 received at the in-coupling DOE 805 from the imager 105 may be at least partially reflected back to the eye side 1125 of the out-coupling DOE 815. As with FIG. 11, only a single waveguide 130 of an optical combiner is shown in the drawing to aid clarity in presentation. As noted above in the discussion that accompanies FIG. 11, the forward propagating light 1115 is typically wasted. The utilization of the broadband reflector 1200 will enable a portion of the forward propagating light to be reflected back to the eye 115 of the user over the entirety of the eyebox to increase the luminance of the displayed holographic images. The reflected holographic image light is indicated by reference numeral 1610 in the drawing.

The amount of forward propagating holographic image light that is recovered is dependent on the degree of reflectance that is specified for the broadband reflector. Increased reflectance will increase luminance of the holographic images and improve light security of the HMD device with the tradeoff that see-through transmission is reduced, as discussed below in the text accompanying FIG. 17. It will be appreciated that the specific balance between holographic image luminance and see-through transmission can be implemented as needed to meet particular application requirements.

Figure 17:
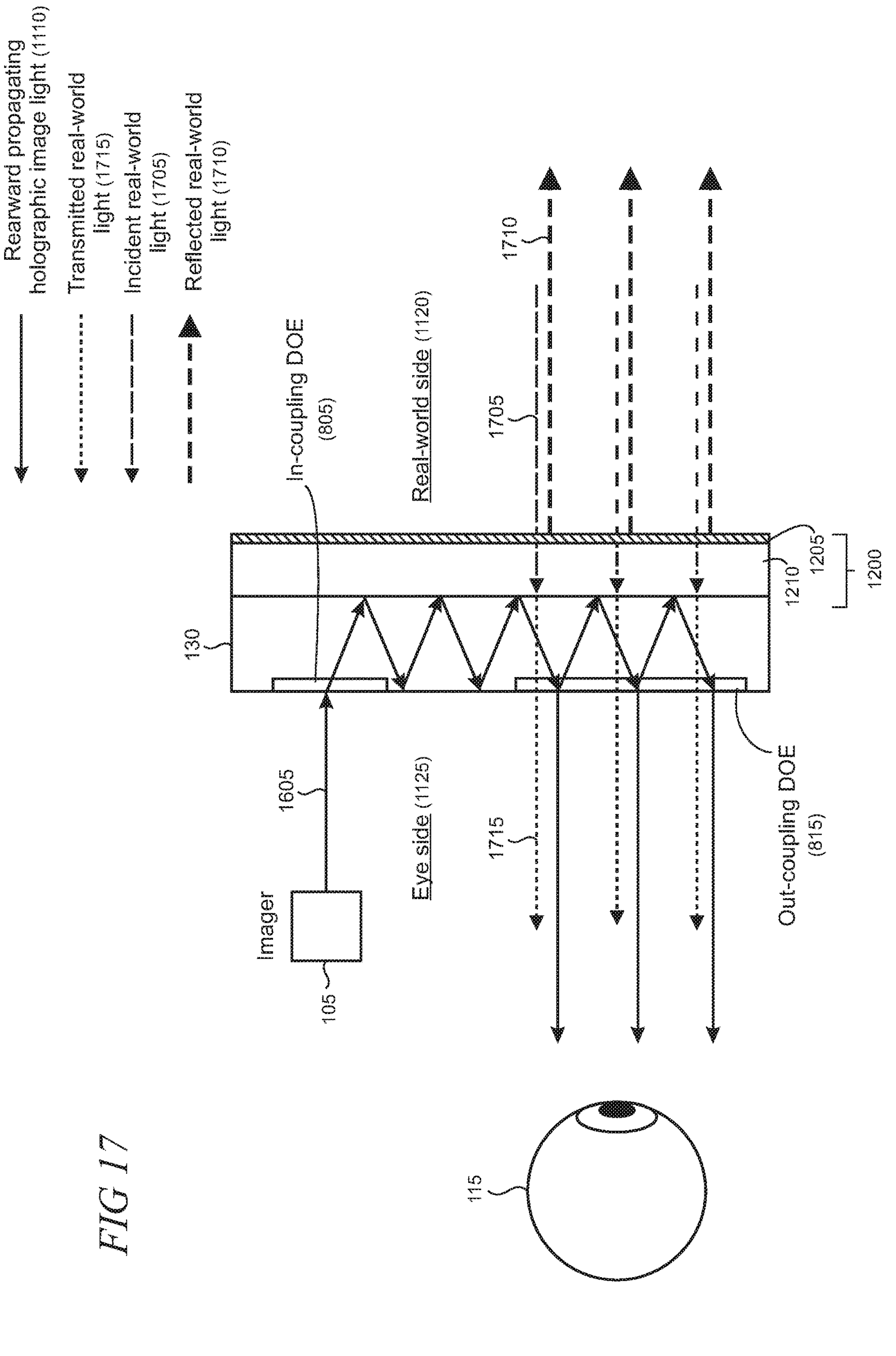
FIG. 17 illustratively shows how real-world light may be at least partially reflected back to the real-world side of an optical combiner.

FIG. 17 illustratively shows how real-world light 1705 that is incident on broadband reflector 1200 may be at least partially reflected back to the real-world-side 1120 of an optical combiner as reflected light 1710. As with the previous drawings, only a single waveguide 130 of the optical combiner is shown in the drawing to aid clarity in presentation. The reduction of transmitted real-world light 1715 is inversely proportional to the amount of real-world light that is reflected by the broadband reflector 1200 in typical implementations.

Figure 18:
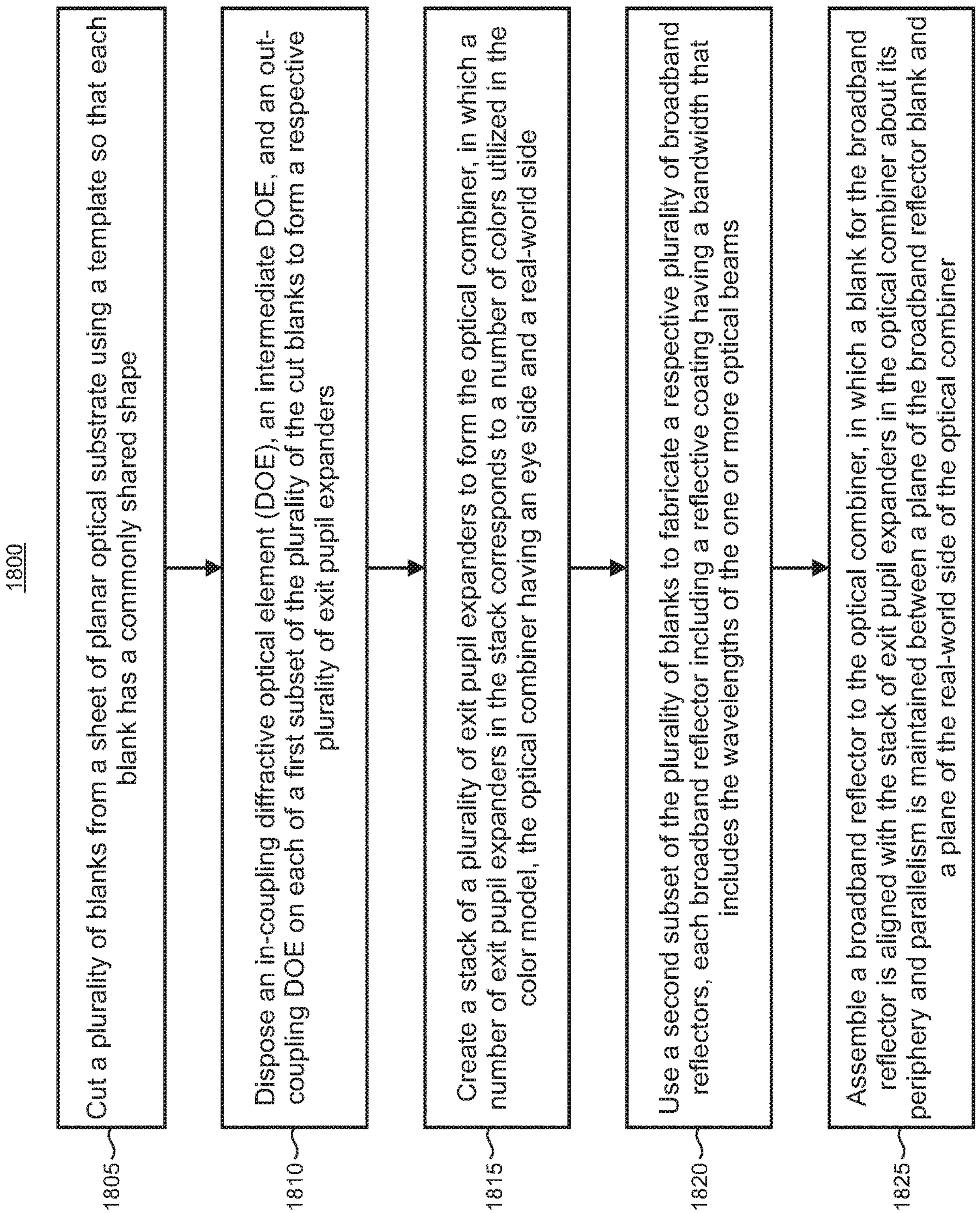
FIG. 18 is a flowchart of an illustrative method of manufacturing a waveguide assembly with a broadband reflector.

FIG. 18 is a flowchart 1800 of an illustrative method of manufacturing a waveguide assembly with a broadband reflector. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1805, a plurality of blanks is cut from a sheet of planar optical substrate using a template so that each blank has a commonly shared shape. In some applications, the planar optical substrate includes glass, but plastic substrates may also be appropriately utilized in other applications. Computer-aided laser cutting may be utilized to implement fast and accurate cuts.

In step 1810, DOEs are disposed on a subset of the cut blanks to create a respective plurality of exit pupil expanders. The DOEs include an in-coupling DOE, an intermediate DOE, and an out-coupling DOE. The in-coupling DOE is configured to in-couple one or more optical beams corresponding to holographic images as an input to a respective exit pupil expander. The intermediate DOE is configured for pupil expansion of the one or more optical beams in a first direction, and the out-coupling DOE configured for pupil expansion of the one or more optical beams in a second direction. The out-coupling DOE is further configured to out-couple the one or more optical beams as an output from the exit pupil expander with expanded pupil relative to the input.

In step 1815, a stack of a plurality of exit pupil expanders is created to form the optical combiner, in which a number of pupil expanders in the stack corresponds to a number of colors utilized in the color model. For example, with an RGB color model, the optical combiner stack includes three exit pupil expanders. For an RGBG color model, the optical combiner stack includes four exit pupil expanders.

In step 1820, a second subset of the plurality of blanks is used to fabricate a respective plurality of broadband reflectors, in which each broadband reflector includes a reflective coating that has a bandwidth that includes the wavelengths of the one or more optical beams. For example, in typical implementations, the broadband reflector has bandwidth that includes the visible spectrum to thereby cover each of the red, blue, and green wavelength ranges.

In step 1825, a broadband reflector is assembled to the optical combiner, in which a blank for the broadband reflector is aligned with the stack of pupil expanders in the optical combiner about its periphery. Such alignment can help to maintain parallelism between a plane of the broadband reflector blank and a plane of the real-world side of the optical combiner. As the blanks used for the optical combiner waveguides and the broadband reflectors are cut from the same material using the same pattern, their common size and shape facilitates easy handling in typical factory settings during assembly. For example, suitable fixtures and tools may be utilized to orient and hold the blanks in place during assembly to ensure that alignment and flatness are maintained according to design specifications to meet the targeted optical characteristics for the completed assemblies.

Figure 19:
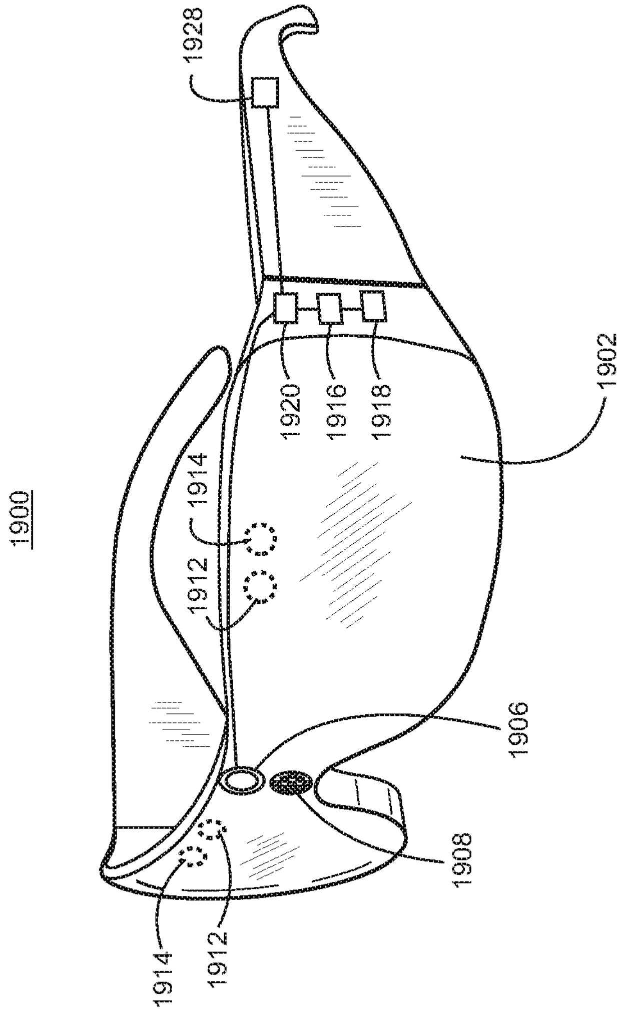
FIG. 19 is a pictorial view of an illustrative example of a virtual-reality or mixed-reality HMD device that may use the present broadband reflector.
Figure 20:
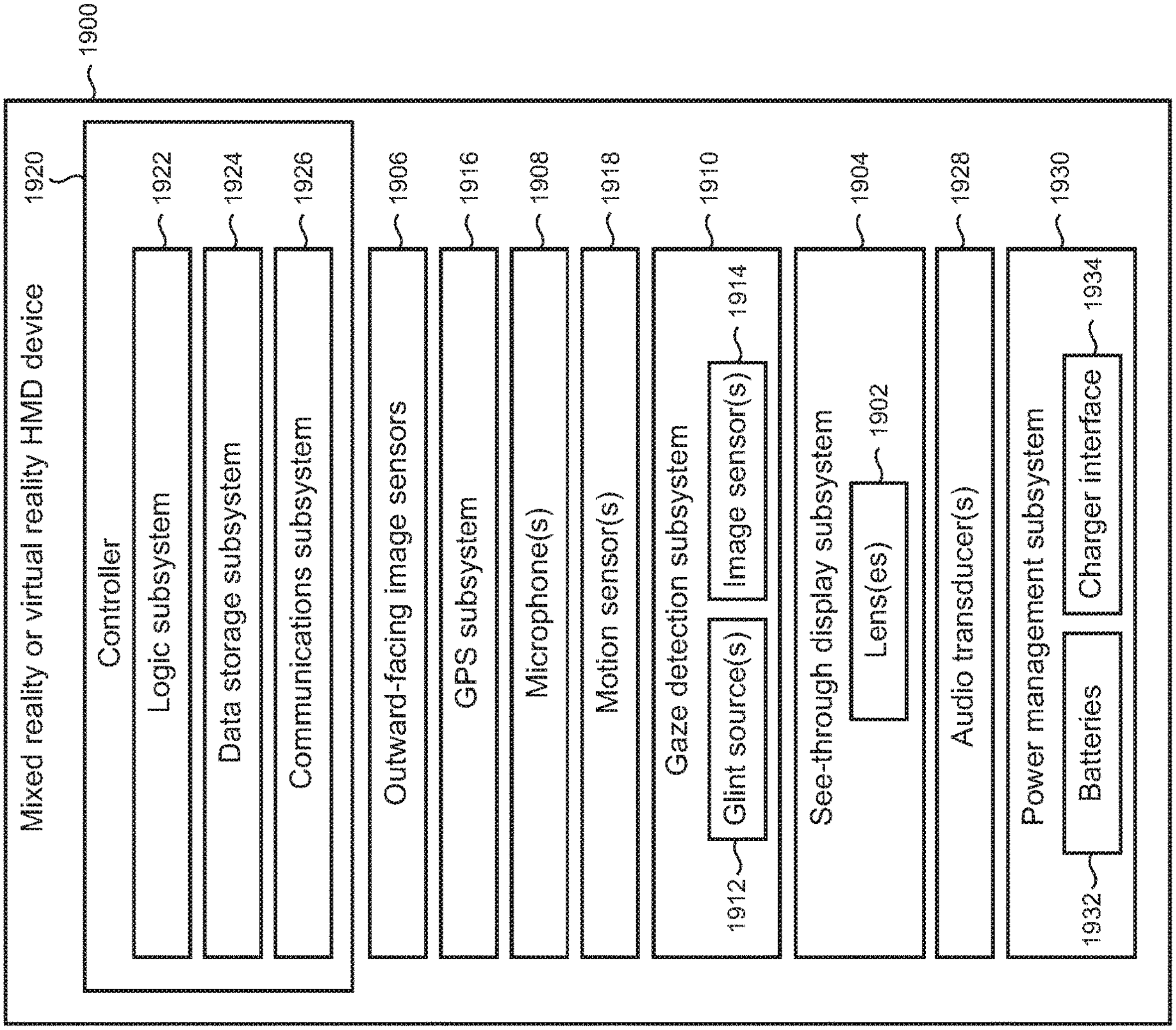
FIG. 20 shows a block diagram of an illustrative example of a virtual reality or mixed-reality HMD device that may use the present broadband reflector.

The present broadband reflector may be utilized in mixed- or virtual-reality applications. FIG. 19 shows one particular illustrative example of a mixed-reality HMD device 1900, and FIG. 20 shows a functional block diagram of the device 1900. HMD device 1900 comprises one or more lenses 1902 that form a part of a see-through display subsystem 1904, so that images may be displayed using lenses 1902 (e.g. using projection onto lenses 1902, one or more waveguide systems, such as a near-eye display system, incorporated into the lenses 1902, and/or in any other suitable manner).

HMD device 1900 further comprises one or more outward-facing image sensors 1906 configured to acquire images of a background scene and/or physical environment being viewed by a user and may include one or more microphones 1908 configured to detect sounds, such as voice commands from a user. Outward-facing image sensors 1906 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 1900 may further include a gaze detection subsystem 1910 configured for detecting a direction of gaze of each eye of a user or a direction or location of focus, as described above. Gaze detection subsystem 1910 may be configured to determine gaze directions of each of a user's eyes in any suitable manner. For example, in the illustrative example shown, a gaze detection subsystem 1910 includes one or more glint sources 1912, such as infrared light sources, that are configured to cause a glint of light to reflect from each eyeball of a user, and one or more image sensors 1914, such as inward-facing sensors, that are configured to capture an image of each eyeball of the user. Changes in the glints from the user's eyeballs and/or a location of a user's pupil, as determined from image data gathered using the image sensor(s) 1914, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1910 may have any suitable number and arrangement of light sources and image sensors. In some implementations, the gaze detection subsystem 1910 may be omitted.

The HMD device 1900 may also include additional sensors. For example, HMD device 1900 may comprise a global positioning system (GPS) subsystem 1916 to allow a location of the HMD device 1900 to be determined. This may help to identify real-world objects, such as buildings, etc. that may be located in the user's adjoining physical environment.

The HMD device 1900 may further include one or more motion sensors 1918 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1906. The use of motion data may allow changes in gaze direction to be tracked even if image data from outward-facing image sensor(s) 1906 cannot be resolved.

In addition, motion sensors 1918, as well as microphone(s) 1908 and gaze detection subsystem 1910, also may be employed as user input devices, such that a user may interact with the HMD device 1900 via gestures of the eye, neck and/or head, as well as via verbal commands in some cases. It may be understood that sensors illustrated in FIGS. 19 and 20 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 1900 can further include a controller 1920 such as one or more processors having a logic subsystem 1922 and a data storage subsystem 1924 in communication with the sensors, gaze detection subsystem 1910, display subsystem 1904, and/or other components through a communications subsystem 1926. The communications subsystem 1926 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1924 may include instructions stored thereon that are executable by logic subsystem 1922, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 1900 is configured with one or more audio transducers 1928 (e.g., speakers, earphones, etc.) so that audio can be utilized as part of a mixed reality or virtual reality experience. A power management subsystem 1930 may include one or more batteries 1932 and/or protection circuit modules (PCMs) and an associated charger interface 1934 and/or remote power interface for supplying power to components in the HMD device 1900.

It may be appreciated that the HMD device 1900 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 21:
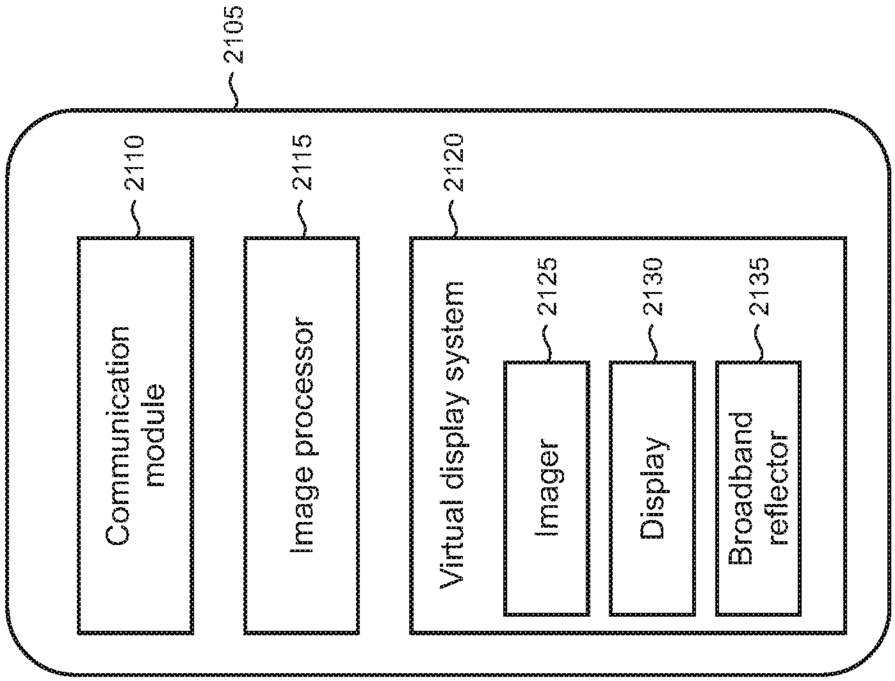
FIG. 21 shows a block diagram of an illustrative electronic device that incorporates a mixed-reality display system that may use the present broadband reflector.

As shown in FIG. 21, a broadband reflector can be used in a mobile or portable electronic device 2100, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 2100 includes a housing 2105 to house a communication module 2110 for receiving and transmitting information from and to an external device, or a remote system or service (not shown).

The portable device 2100 may also include an image processor 2115 using one or more processors for handling the received and transmitted information, and a virtual display system 2120 to support viewing of images. The virtual display system 2120 can include a micro-display or an imager 2125 configured to provide holographic images on a display 2130. The image processor 2115 may be operatively connected to the imager 2125 and obtain real-world image data, such as video data from a camera in the device (not shown), so that virtual- and/or mixed-reality images may be rendered on the display 2130. In implementations in which one or more DOEs are utilized to support the display, or where real- or virtual-world image light propagates in a direction opposite to the user's eyes, a broadband reflector 2135 may implemented in accordance with the inventive principles of operation discussed herein.

The broadband reflector may also be utilized in non-portable devices that are configured for virtual- and/or mixed-reality applications having a display, such as gaming devices, multimedia consoles, personal computers, vending machines, smart appliances, Internet-connected devices, and home appliances, such as an oven, microwave oven and other appliances, and other non-portable devices.

Various exemplary embodiments of the present broadband reflector for waveguide assembly in a head-mounted display are now presented by way of illustration and not as an exhaustive list of all embodiments. An example includes a near-eye mixed-reality optical system, comprising: a see-through planar optical waveguide through which real-world images are viewable by a user of the mixed-reality optical system, the optical waveguide including a first planar side and a second planar side opposite the first planar side; a first diffractive optical element (DOE) disposed on a surface of one of the planar sides of the optical waveguide, the first DOE having an input region and configured as an in-coupling grating to in-couple, at the input region, one or more optical beams associated with holographic images from a holographic image source; a second DOE disposed on a surface of one of the planar sides of the optical waveguide and configured for pupil expansion of the one or more optical beams along a first direction; a third DOE disposed on a surface of one of the planar sides of the optical waveguide, the third DOE having an output region and configured for pupil expansion of the one or more optical beams along a second direction, and further configured as an out-coupling grating to out-couple, as an output display from the output region to an eye of the user, the one or more optical beams having expanded pupil relative to the input; and a broadband reflector disposed on a planar side of the optical waveguide that is opposite the third DOE, the broadband reflector having a bandwidth that at least includes wavelengths of the one or more optical beams associated with the holographic images, wherein the broadband reflector comprises a reflective coating disposed on a planar substrate, and wherein the substrate and optical waveguide are tightly coupled with a uniform gap to maintain parallelism between the plane of the substrate and the plane of the optical waveguide within a predetermined threshold.

In another example, the reflective coating comprises multiple layers of two or more dielectric materials, each of the two or more dielectric materials having a different refractive index. In another example, the dielectric materials comprise one of silicon dioxide ($SiO_2$), titanium dioxide ($TiO_2$), or aluminum oxide ($Al_2O_3$). In another example, the one or more optical beams comprise one of a red wavelength range, blue wavelength range, or green wavelength range. In another example, the near-eye mixed-reality optical system further comprises a second see-through planar optical waveguide and a third see-through planar optical waveguide, the see-through planar optical waveguides being configured in a stack to form an optical combiner wherein each see-through planar optical waveguide propagates one or more optical beams for the holographic images for a different color in an RGB (red, green, blue) color model, the optical combiner having an eye side and a real-world side, wherein the broadband reflector is tightly coupled to the real-world side. In another example, the uniform gap is maintained using one of spacer or structural fitting that is disposed along one or more peripheral edge of the planar substrate or planar waveguide. In another example, the planar substrate of the broadband reflector and the see-through planar optical waveguide each comprises a glass material.

A further examples includes a head-mounted display (HMD) device wearable by a user and supporting a mixed-reality experience including full color holographic images from a virtual world that are represented with a color model and real-world images for objects in a real-world, comprising: an imager generating one or more input optical beams for the holographic images for each individual color in the color model; an optical combiner having a waveguide for each individual color, in which the waveguides optically align in a planar stack to combine the individual colors into the full color holographic images with output from the optical combiner, wherein the optical combiner has a first planar surface and a second planar surface opposite the first planar surface, the first planar surface facing the user's eyes and the second planar surface facing the real world when the HMD is worn; an exit pupil expander disposed on each of the waveguides for each individual color, the exit pupil expander comprising a structure on which multiple diffractive optical elements (DOEs) are disposed, in which the exit pupil expander is configured to provide one or more out-coupled optical beams as an output at the first planar surface of the optical combiner having an expanded exit pupil; and a broadband reflector disposed on the second planar surface of the optical combiner which is configured to reflect full color holographic image light that is out-coupled from each of the exit pupil expanders towards the real world back towards the user's eyes.

In another example, the broadband reflector is partially reflective and partially transmissive such that light from the real-world images is partially transmitted through the broadband reflector to the user's eyes and partially reflected by the broadband reflector. In another example, the exit pupil expander provides exit pupil expansion in two directions. In another example, the imager includes one of light emitting diode, liquid crystal on silicon device, organic light emitting diode array, or micro-electro mechanical system device. In another example, the waveguides and DOEs are configured to be see-through. In another example, the optical combiner includes three waveguides wherein a separate waveguide is utilized for each color in a red, green, blue (RGB) color model. In another example, the broadband reflector is configured to meet a threshold range of reflectance across a range of angles that comprise a field of view (FOV) of the HMD device. In another example, the broadband reflector includes a thin film coating comprising a single layer.

A further example includes a method for assembling an optical combiner that is associated with a color model and utilized in a mixed-reality environment in which holographic images are mixed with real-world images, comprising: cutting a plurality of blanks from a sheet of planar optical substrate using a template so that each blank has a commonly shared shape; disposing an in-coupling diffractive optical element (DOE), an intermediate DOE, and an out-coupling DOE on each of a first subset of the plurality of the cut blanks to form a respective plurality of exit pupil expanders, the in-coupling DOE configured to in-couple one or more optical beams corresponding to holographic images as an input to a respective exit pupil expander, the intermediate DOE configured for pupil expansion of the one or more optical beams in a first direction, and the out-coupling DOE configured for pupil expansion of the one or more optical beams in a second direction and further configured to out-couple the one or more optical beams as an output from the exit pupil expander with expanded pupil relative to the input; creating a stack of a plurality of exit pupil expanders to form an optical combiner, in which a number of exit pupil expanders in the stack corresponds to a number of colors utilized in the color model, the optical combiner having an eye side and a real-world side; using a second subset of the plurality of blanks to fabricate a respective plurality of broadband reflectors, each broadband reflector including a reflective coating having a bandwidth that includes the wavelengths of the one or more optical beams; and assembling a broadband reflector to the optical combiner, in which a blank for the broadband reflector is aligned with the stack of exit pupil expanders in the optical combiner about its periphery and parallelism is maintained between a plane of the broadband reflector blank and a plane of the real-world side of the optical combiner.

In another example, the planar optical substrate comprises glass and the DOEs are fabricated from plastic. In another example, the method further includes, prior to assembling the broadband reflector to the optical combiner, applying the coating to the second subset of blanks as a thin film comprising a plurality of layered dielectric materials in which two or more of the layers comprise different dielectric materials using one of chemical or physical deposition. In another example, the method further includes assembling the optical combiner and broadband reflector to maintain an even gap between successive blanks in the stack. In another example, the even gap between successive blanks in the stack is in range between 50 μm and 300 μm.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A near-eye mixed-reality optical system in which holographic images are mixed in with views of a real world, comprising:

a see-through planar optical waveguide through which real-world images are viewable by a user of the mixed-reality optical system, the optical waveguide including a first planar side and a second planar side opposite the first planar side;

a first diffractive optical element (DOE) disposed on a surface of one of the planar sides of the optical waveguide, the first DOE having an input region and configured as an in-coupling grating to in-couple, at the input region, one or more optical beams associated with holographic images from a holographic image source;

a second DOE disposed on a surface of one of the planar sides of the optical waveguide and configured for pupil expansion of the one or more optical beams along a first direction;

a third DOE disposed on a surface of one of the planar sides of the optical waveguide, the third DOE having an input and an output region and configured for pupil expansion of the one or more optical beams along a second direction, and further configured as an out-coupling grating to out-couple, as an output display from the output region to an eye of the user, the one or more optical beams having expanded pupil relative to the input; and a broadband reflector disposed on a planar side of the optical waveguide that is opposite the third DOE, the broadband reflector having a bandwidth including a range of visible wavelengths from 400 to 650 nm, wherein the broadband reflector reflects both wavelengths associated with holographic image light and wavelengths associated with the views of the real world, wherein the broadband reflector comprises a single-layer thin-film reflective coating disposed on a planar substrate, and wherein the substrate and optical waveguide are tightly coupled with a uniform gap to maintain parallelism between the plane of the substrate and the plane of the optical waveguide within a predetermined threshold.

2. The near-eye mixed-reality optical system of claim 1 in which the reflective coating comprises multiple layers of two or more dielectric materials, each of the two or more dielectric materials having a different refractive index.

3. The near-eye mixed-reality optical system of claim 2 in which the dielectric materials comprise one of silicon dioxide ($SiO_2$), titanium dioxide ($TiO_2$), or aluminum oxide ($Al_2O_3$).

4. The near-eye mixed-reality optical system of claim 1 in which the one or more optical beams comprise one of a red wavelength range, blue wavelength range, or green wavelength range.

5. The near-eye mixed-reality optical system of claim 1 further comprising a second see-through planar optical waveguide and a third see-through planar optical waveguide, the see-through planar optical waveguides being configured in a stack to form an optical combiner wherein each see-through planar optical waveguide propagates one or more optical beams for the holographic images for a different color in an RGB (red, green, blue) color model, the optical combiner having an eye side and a real-world side, wherein the broadband reflector is tightly coupled to the real-world side.

6. The near-eye mixed-reality optical system of claim 1 in which the uniform gap is maintained using one of spacer or structural fitting that is disposed along one or more peripheral edge of the planar substrate or planar waveguide.

7. The near-eye mixed-reality optical system of claim 1 in which the planar substrate of the broadband reflector and the see-through planar optical waveguide each comprises a glass material.

8. The near-eye mixed-reality optical system of claim 6 in which the broadband reflector is configured to meet a threshold range of reflectance across a range of angles that comprise a field of view (FOV) of an HMD device in which the near-eye mixed-reality optical system is incorporated.

* * * * *